(12) United States Patent
Tehrani et al.

(10) Patent No.: US 11,517,135 B2
(45) Date of Patent: *Dec. 6, 2022

(54) COOKWARE ASSEMBLY

(71) Applicant: Lagom Kitchen Co., Culver City, CA (US)

(72) Inventors: Amir Tehrani, Los Angeles, CA (US); Zachary Rosner, Los Angeles, CA (US)

(73) Assignee: Lagom Kitchen Co., Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,342

(22) Filed: Mar. 9, 2022

(65) Prior Publication Data

US 2022/0192409 A1   Jun. 23, 2022

Related U.S. Application Data

(63) Continuation of application No. 16/513,966, filed on Jul. 17, 2019, now Pat. No. 11,278,148.

(51) Int. Cl.
*A47J 27/13* (2006.01)
*A47J 45/06* (2006.01)
*A47J 36/06* (2006.01)

(52) U.S. Cl.
CPC .............. *A47J 27/13* (2013.01); *A47J 36/06* (2013.01); *A47J 45/06* (2013.01)

(58) Field of Classification Search
CPC .. A47J 27/13; A47J 36/06; A47J 45/06; A47J 36/08; A47J 36/00; A47J 37/0871;
(Continued)

(56) References Cited

U.S. PATENT DOCUMENTS

| 4,310,418 A | 1/1982 | Busbey |
| 5,819,640 A | 10/1998 | Cuomo et al. |

(Continued)

FOREIGN PATENT DOCUMENTS

| CA | 2455023 A1 | 7/2004 |
| DE | 8521152 U1 | 10/1985 |

(Continued)

OTHER PUBLICATIONS

International Search Report and Written Opinion for PCT/US2020/042498 dated Oct. 15, 2020.

(Continued)

*Primary Examiner* — Phuong T Nguyen
(74) *Attorney, Agent, or Firm* — Banner & Witcoff, Ltd.

(57) ABSTRACT

A cookware assembly including a cooking vessel with a vessel side wall and an elongated handle extending outwardly from the sidewall, a cover, an opening in at least one of the vessel side wall and the cover in an area above the elongated handle, and a utensil, where the handle of the utensil rests in relation to the elongated handle and the opening permits the utensil component to reside in the interior of the covered cooking vessel when the cover is on the cooking vessel. The cover can be placed on the cooking vessel in a plurality of positions, to allow the utensil to pass to the interior of the cooking vessel, to allow pouring from the cooking vessel with the cover on, and to seal the cover on the cooking vessel without the utensil. An auxiliary vessel can also be included as part of the cooking assembly.

4 Claims, 6 Drawing Sheets

(58) Field of Classification Search
CPC .............. A47J 37/0814; A47J 37/0611; A47J 37/0878; A47J 37/108; A47J 37/10; A47J 37/06; A47J 36/34; A47J 45/061; A47J 37/101
USPC ......... 99/327, 331, 339, 341, 348, 357, 372, 99/385, 389, 391, 400, 422, 424, 425, 99/427, 444, 446, 448, 449, 483, 530
See application file for complete search history.

(56) References Cited

U.S. PATENT DOCUMENTS

| | | | |
|---|---|---|---|
| 5,943,947 | A | 8/1999 | Adams |
| 6,182,557 | B1 | 2/2001 | Wilk |
| 6,360,654 | B1* | 3/2002 | Cornfield ............... A47J 36/16 99/422 |
| 6,796,221 | B1 | 9/2004 | Cangioli |
| 6,852,953 | B1 | 2/2005 | Lee |
| 6,973,871 | B1 | 12/2005 | Chuang et al. |
| 2013/0037553 | A1* | 2/2013 | Bourbeau ............ A47J 45/061 220/573.1 |
| 2014/0197186 | A1 | 7/2014 | Smith |
| 2016/0066743 | A1 | 3/2016 | Prommel et al. |
| 2017/0251873 | A1 | 9/2017 | Li et al. |
| 2018/0271331 | A1 | 9/2018 | Lee |

FOREIGN PATENT DOCUMENTS

| | | |
|---|---|---|
| EP | 2976977 A1 | 1/2016 |
| RU | 2264152 C1 | 11/2005 |
| WO | 2006/100367 A1 | 9/2006 |
| WO | 2011/070601 A1 | 6/2011 |

OTHER PUBLICATIONS

International Search Report with Written Opinion issued by the Russian Federal Institute of Industrial Property for International Patent Application No. PCT/US2021/035497, dated Nov. 25, 2021.
Non-Final Office Action issued by the United States Patent and Trademark Office for corresponding U.S. Appl. No. 16/513,966, dated Nov. 18, 2021.
Notice of Allowance issued by the United States Patent and Trademark Office for corresponding U.S. Appl. No. 16/513,966, dated Feb. 9, 2022.
Jan. 18, 2022—(WO) International Preliminary Report on Patentability—PCT/US2020/042498.

* cited by examiner

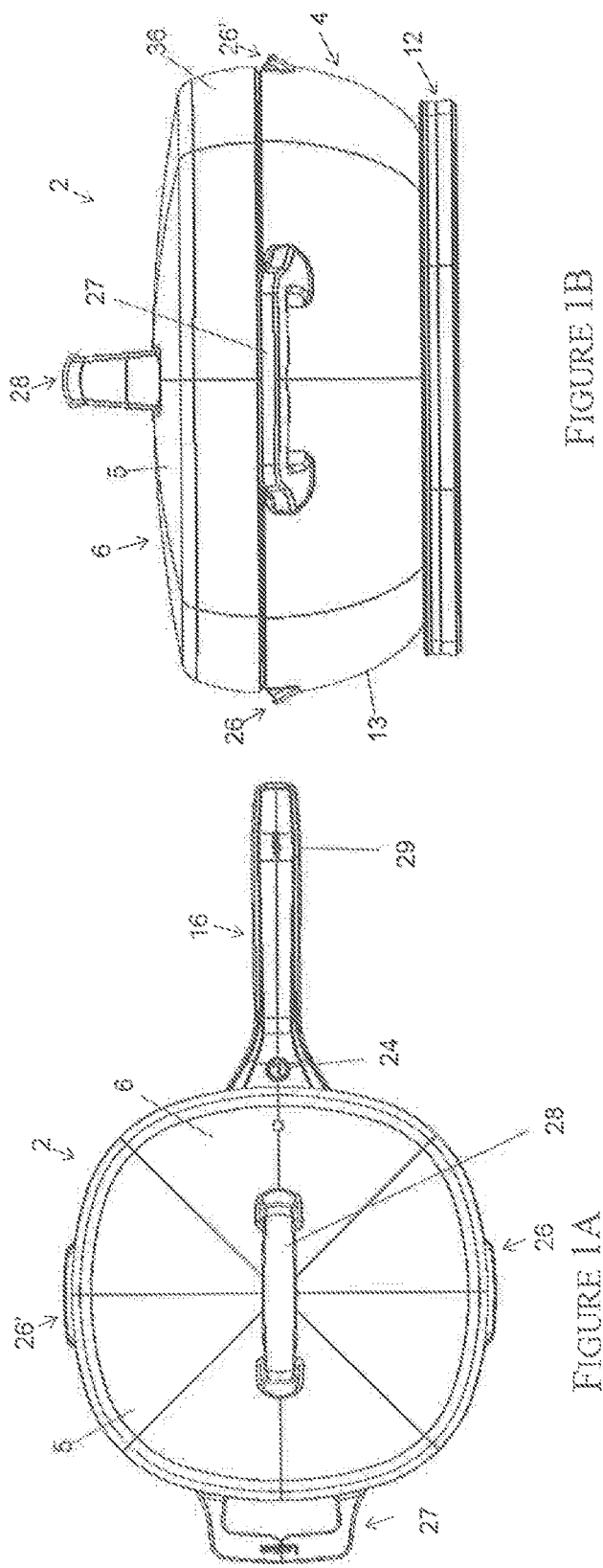
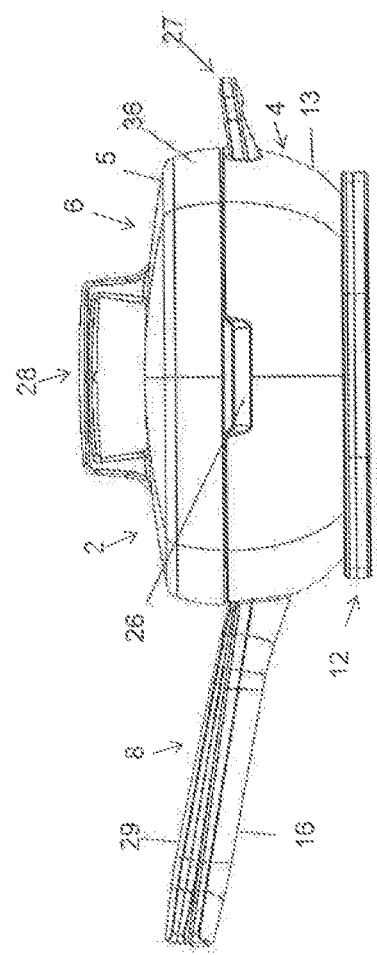
FIGURE 1A
FIGURE 1B
FIGURE 1C

COOKWARE ASSEMBLY

CROSS-REFERENCE TO RELATED APPLICATIONS

This application is a continuation application of U.S. Nonprovisional application Ser. No. 16/513,966 filed on Jul. 17, 2019, the contents of which are incorporated herein by reference.

FIELD OF THE INVENTION

The present invention relates to the field of cookware, and more specifically to a cookware assembly.

BACKGROUND OF THE INVENTION

Cookware may be bulky and difficult to store, especially when a number of different types of culinary preparations are anticipated. To enable cooking a variety of different culinary preparations, it is common to require a number of different cookware items, mainly sold independently. Often, these different, independent cookware items do not always work well with other cookware items.

For example, cooking vegetables may require a pan, a cover, a utensil to manipulate the food product during cooking, a spoon rest to keep the utensil from resting on a countertop when not in use, and potentially a steamer, a double boiler or the like.

What is therefore needed is a cookware assembly that is versatile and adaptable to a variety of different cooking environments and can perform a variety of culinary preparation functions. What is also needed is a cookware assembly that contains a number of necessary appliances and does not require extra components to properly use the cookware.

SUMMARY OF THE INVENTION

The present invention is directed to a cookware assembly comprising a cooking vessel, a cover, and a utensil. The cookware assembly of the present invention can also optionally comprise an auxiliary vessel, a trivet and/or other component pieces to aid in a variety of different cooking tasks.

The cooking vessel of the present invention preferably comprises a bottom and side walls extending upwardly from the bottom, with an interior and an exterior. The cooking vessel can be made of a single material or can be made of a layered material, with the same or different materials on the interior and exterior, and optionally having layers therebetween. For example, a cladded material can be used for the bottom of the cooking vessel that includes a copper or aluminum layer that aids in even heat distribution across the bottom interior of the cooking vessel, while providing a favored cooking surface on the interior of the cooking vessel.

An elongated handle extends from a side wall of the cooking vessel. The elongated handle preferably comprises a surface, channel, trough or other support structure on the top surface for nesting or resting the handle of a utensil and an engagement member. The engagement member, preferably in the nature of an extension, such as a post, a depression, an aperture, a magnet, a magnetic element or the like, engages an opposed corresponding engagement member on the utensil, preferably in the nature of an aperture, depression, extension or post, magnet, magnetic element or the like, to maintain the utensil in a desired position relative to the cooking vessel. The utensil may optionally have other features, such as a dog, groove or the like, to position and retain the utensil on the cooking vessel. In some embodiments, the cooking vessel handle can be removable, or have a removable portion, for replacement if damaged.

The cooking vessel further comprises a cutout along a portion of the upper edge of the side wall in the area above the handle. The dimensions of the cutout preferably conform to the dimensions of the portion of the utensil corresponding to the wall when the utensil is engaged on the engagement member of the cooking vessel. Accordingly, the implement of the utensil is maintained over the interior of the cooking vessel, and the utensil handle is retained on the elongated handle of the cooking vessel, when the utensil is engaged on the cooking vessel.

Preferably, the upper edges of the side walls of the cooking vessel include one or more additional cutouts, preferably associated with a spout on the side wall for pouring from the cutout. More particularly, a spout for pouring out liquids preferably extends outwardly from a cutout on at least one upper edge of a cooking vessel side wall orthogonal to the handle.

The cooking vessel preferably further comprises a support handle on the side wall opposite the elongated handle. This provides an additional support to lift or pour the cooking vessel with two hands.

The cover preferably comprises a top surface, a cover handle extending upwardly from the top surface, a lip to position and hold the cover on the cooking vessel, and optionally a downward extending rim about the top surface. When the cover includes a rim, the lip can be in the form of a recessed edge on the rim, and when the cover is relatively flat at the edge, the lip can extend as a protrusion from the inner surface of the cover. The lip on the rim preferably fits inside the cooking vessel during either use or storage. Additionally, the inner surface of the top of the cover may be textured, to act as a drip surface facilitating dripping of condensation from the inner surface of the top of the cover back into the cooking vessel.

A gap is provided along a portion of the cover, and preferably in the lip of the cover, corresponding in dimensions to the cutout on the edge of the side wall of the cooking vessel, to permit the utensil to pass through into the vessel when engaged with the engagement member of the cooking vessel with the cover on. Most preferably, however, the cooking vessel and the cover are shaped so that the cover can be placed on the cooking vessel in various positions.

For example, the cooking vessel and cover can both be in the general shape of a square with rounded corners, so that the cover can be placed on the cooking vessel with the gap aligned in any of four positions. Alternatively, the cooking vessel and cover can be round, preferably including indicators to determine the position of the gap of the cover on the cooking vessel.

In a first position, the gap on the cover is aligned with the cutout on the wall of the cooking vessel over the elongated handle. In this position, the gap on the cover and cutout on the cooking vessel cooperate to form an opening in the covered cooking vessel through which the utensil extends when the utensil is engaged on the cooking vessel. When in this position, the lip of the cover closes the spouted cutouts on one or both orthogonal side walls, substantially closing the cookware assembly if not fully sealing it.

In a second position, the gap in the cover is placed in line with a spouted cutout on the cooking vessel orthogonal to the handle. In this second position, the gap on the cover and the cutout on the cooking vessel align to form an opening through which fluids can be poured from the cookware assembly with the cover on. If a spouted cutout is also formed on the opposed side of the cooking vessel orthogonal to the handle, a fourth cover position aligns with the opposed spouted cutout.

In a third position, the gap in the cover is placed in line with a portion of the cooking vessel that does not have a cutout, so as to substantially seal the cover on the cooking vessel without the utensil on the cooking vessel.

The utensil preferably comprises an implement and a handle. The implement can be any suitable implement depending on the cooking task being performed, including but not limited to a turner, a ladle, a spatula, a scraper, etc., or a collection of these that can be interchangeably use with the cookware. The handle of the utensil is preferably shaped so that it cooperates with the handle of the cooking vessel, i.e., can be received on the top surface of the cooking vessel handle, to nest with or rest on the handle.

An engagement cooperating member on the handle of the utensil, located near the implement end, near the terminal end, or therebetween, cooperates with the engagement member on the cookware vessel to align and maintain the utensil on the cooking vessel. The cooperating members can be physical elements, such as posts, dogs, depressions, apertures, channels or the like, or other cooperating engagement members such as, for example, magnetic members, for properly positioning the utensil on the cooking vessel handle. Additional engagement members can also be incorporated into the utensil, as desired, i.e., a dog on the bottom of the utensil handle that is positioned to rest adjacent the interior side wall of the cooking vessel when the cooperating members are engaged.

In some embodiments, the cookware assembly can comprise an auxiliary vessel, such as a steamer, a double boiler, etc. The auxiliary vessel preferably comprises a floor, a side wall surrounding the floor and one or more legs to raise the auxiliary vessel off of the interior bottom of the cooking vessel, where the shape of the auxiliary vessel generally conforms to the shape of the cooking vessel. When the auxiliary vessel is a steamer, openings may be present through at least a portion of the floor and/or the side wall, including but not limited to one or more rows of openings along one or more walls and a pattern of openings on the floor.

The side wall of the auxiliary vessel also preferably includes a cutout for the utensil to extend into the interior of the auxiliary vessel when the auxiliary vessel is placed in the cooking vessel, the utensil is placed on the cooking vessel and the cover is engaged. This not only permits the placement of the utensil on the cookware when cooking, but also the full assembly of the cookware assembly for storage. Of course, the side wall of the auxiliary vessel does not require a cutout if it is sufficiently short, i.e., if the utensil resides above the sidewall when the utensil is placed on the cooking vessel with the auxiliary vessel therein and the cover engaged.

In some embodiments, the cookware assembly can also include a trivet. The preferred trivet comprises a top surface and a bottom surface. In a preferred embodiment, the top surface of the trivet generally conforms to the contours of the exterior bottom of the cooking vessel, rising slightly to the sides of the cooking vessel, to create a concave surface that minimizes movement of the cooking vessel on the trivet. The bottom surface is preferably flat, for resting on a counter or table.

In a most preferred embodiment, the trivet is made of wood, a high-temperature polymer or other suitable material, and may be used as a cutting board. The concave top surface may be used when cutting foods such as meats that create juices, where the juices will not run off of the top surface, or the trivet may be turned over with the flat bottom surface facing up to provide a flat cutting surface for food preparation.

BRIEF DESCRIPTION OF THE DRAWINGS

The present invention will be better understood when considered in view of the attached drawings, in which like reference characters indicate like parts. The drawings, however, are presented merely to illustrate the preferred embodiments of the invention without limiting the invention in any manner whatsoever.

FIG. 1A is a top view of a cookware assembly according to the present invention in its closed configuration.

FIG. 1B is a front view of a cookware assembly according to the present invention in its closed configuration.

FIG. 1C is a side view of a cookware assembly according to the present invention in its closed configuration.

DETAILED DESCRIPTION OF THE PREFERRED EMBODIMENT

Figure 2:
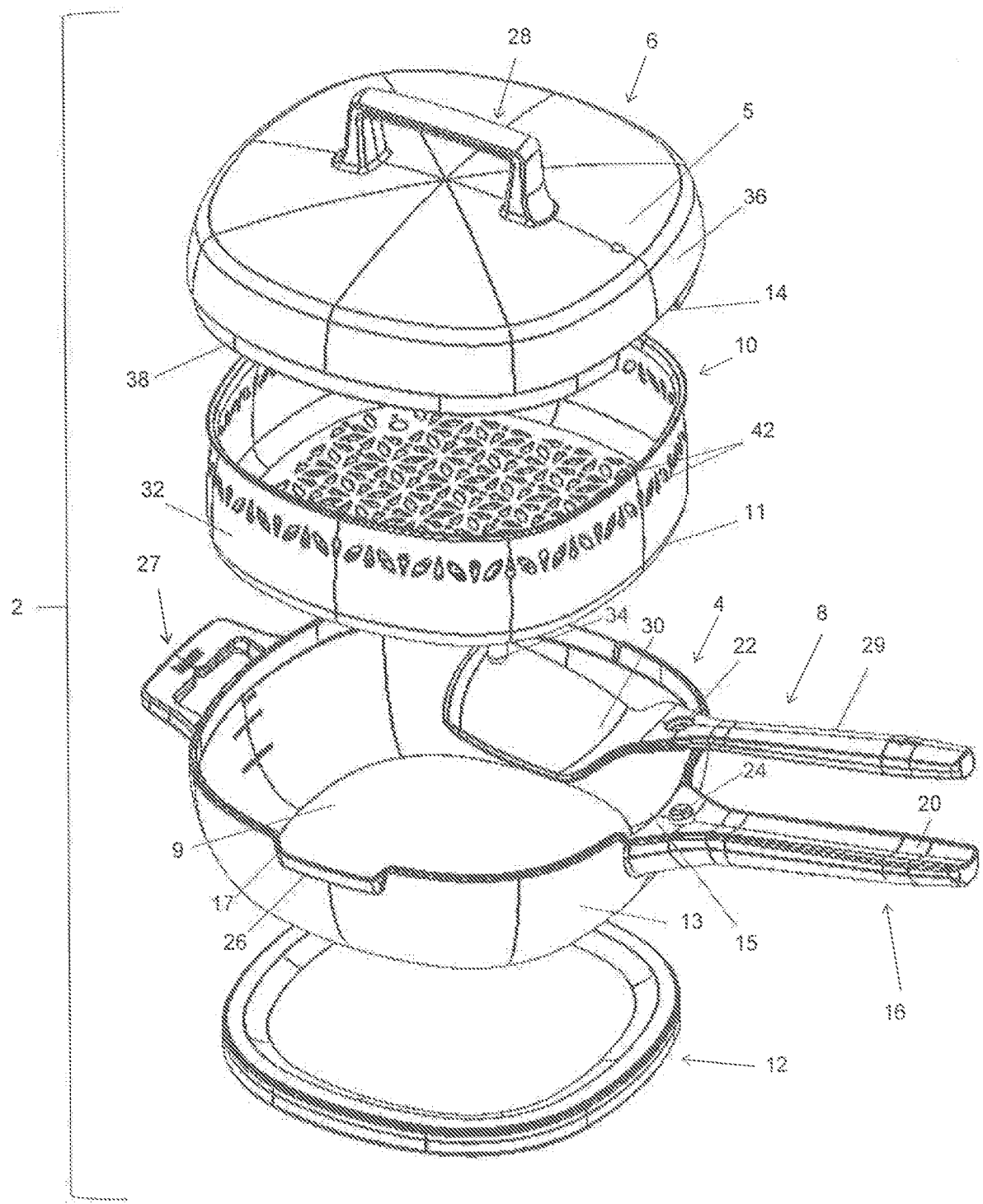
FIG. 2 is an exploded view of a cookware assembly according to the present invention.

The following description of the preferred embodiment is presented to describe the present invention without limiting the scope of the invention.

The present invention is directed to a cookware assembly 2. The cookware assembly 2 comprises a cooking vessel 4, a cover 6, and a utensil 8. The cookware assembly 2 can also include one or more of an auxiliary vessel 10, a trivet 12 and/or similar add-on components.

The cooking vessel 4 can function as any suitable vessel including a pot, a pan, a wok, a Dutch oven, a grill pan, a roasting pan, a pressure cooker, a stockpot, a casserole, a slow cooker, and the like, with a bottom 9 and a continuous side wall 13. The cooking vessel 4 can be made of any suitable material including stainless steel, carbon steel, copper, cast iron, cast aluminum, enameled aluminum, alloys, silicates, ceramics, alloys, composites or layers, as well as combinations of these or other materials, and the like. In a preferred embodiment, the cooking vessel 4 is made of cast aluminum.

The cooking vessel 4 can have any suitable capacity such as from about 0.25 quarts to about forty quarts, preferably from about 0.5 quarts to about twenty quarts, more preferably from about one quart to about ten quarts, and most preferably about three quarts to about eight quarts.

Figure 3B:
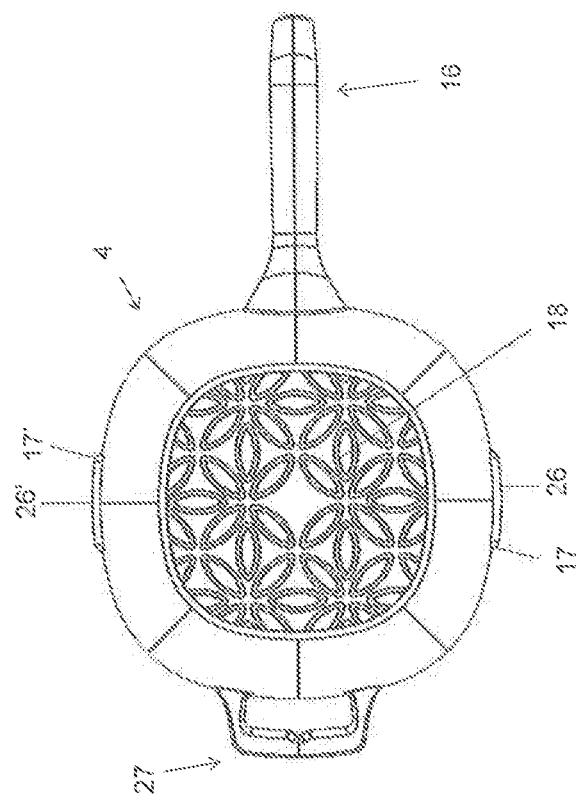
FIG. 3B is a bottom view of a cooking vessel of a cookware assembly according to the present invention.
Figure 3A:
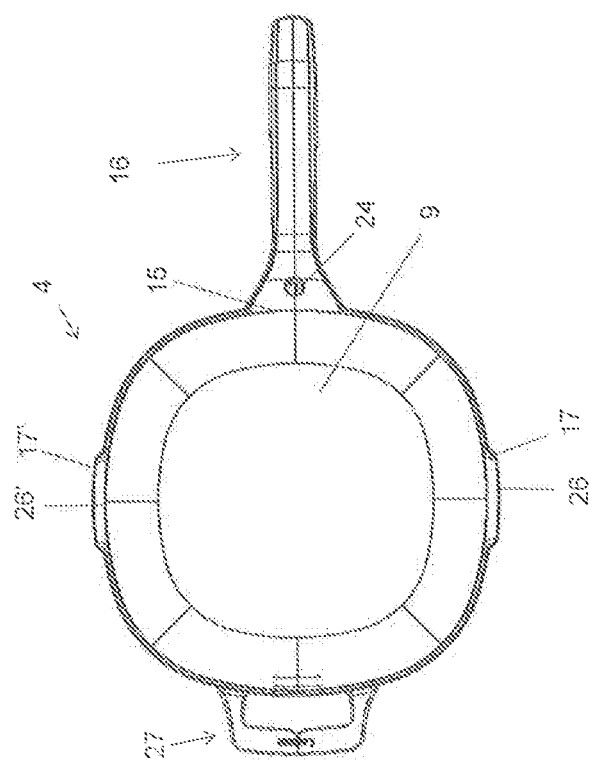
FIG. 3A is a top view of a cooking vessel of a cookware assembly according to the present invention.

The cooking vessel 4 preferably comprises an interior and an exterior, as shown in FIGS. 3A and 3B. The interior can comprise a non-stick coating, including, for example, polytetrafluoroethylene (PTFE), a perfuloroalkoxy alkane (PFA), manganese oxide polystyrene, zinc oxide polystyrene, fluorinated silanes, etc., as known in the art. The interior, and particularly the interior bottom surface, can also be textured, if desired, including features such as lines, ridges, grids, concentric circles, etc.

As shown in FIG. 3B, the exterior bottom surface 18 of the cooking vessel 4 can be flat or patterned with raised or depressed features, and can include one or more layers of material for improving heat distribution on the interior bottom surface of the cooking vessel 4.

An elongated handle 16 preferably extends from the side wall 13 of the cooking vessel 4. The elongated handle 16 can have any suitable shape and can be made of any suitable material, however, it is preferred that the elongated handle be formed of a heat resistant material including wood, stainless steel, silicone, high-temperature polymer, carbon steel, copper, cast iron, cast aluminum, enameled aluminum, alloys, etc., and combinations thereof.

The upper surface of the preferred elongated handle 16 preferably comprises a nesting surface or trough 20 along at least a portion of its length for nesting the utensil handle 29. As shown in FIG. 2, the nesting surface 20 is preferably concave, forming a negative of the shape or curvature of the handle 29 of the utensil 8. Notwithstanding, the nesting surface 20 can be of any suitable curvature or geometry as long as it permits the utensil handle 29, and possibly a portion of the implement 30 or transition from the utensil handle 29 to the implement 30 of the utensil 8, to rest thereon.

In the preferred embodiment, the cooking vessel elongated handle 16 also comprises an engagement member 24, shown in the form of a post, for engaging the utensil 8 and maintaining the utensil 8 in proper engagement with the cooking vessel 4. The engagement member 24 on the cooking vessel 4 cooperates with a cooperating engagement member 22 on the utensil 8. As shown, the preferred embodiment comprises an aperture 22 on the utensil 8 that receives the post 24 on the elongated handle 16 to properly position the utensil 8 on the cooking vessel 4. Preferably, the post 24 is cylindrical with the aperture 22 on the utensil 8 being circular, however, any suitable shape for the post/aperture can be used.

A cutout 15 is fashioned on the upper edge of a portion of the side wall 13 of the cooking vessel 4 above the elongated handle 16 to allow the implement 30 of the utensil 8 to extend into the interior of the cooking vessel 4 when the handle 29 of the utensil 8 rests on the elongated handle 16. In this regard, the cutout 15 cooperates with a gap 14 on the cover 6, when positioned in proper alignment, to seal the cover 6 on the cooking vessel 4 with the utensil 8 resting on the cooking vessel elongated handle 16. As such, the size and shape of the cutout 15 on the cooking vessel 4, and the gap 14 on the cover 6, correspond to the size and shape of the portion of the utensil 8 passing therethrough when the utensil 8 is resting on the cooking vessel handle 16.

The preferred cooking vessel 4 also includes at least one additional cutout 17 in the upper edge of the side wall 13 of the cooking vessel 4, terminating in an outwardly angled spout 26. The additional cutout 17 is preferably placed orthogonal to the cutout 15 above the cooking vessel elongated handle 16, generally conforming to the size and shape of the cutout 15 above the elongated handle 16. The spout 26 is adapted for pouring liquids out of the cooking vessel 4, either with the cover 6 removed from or with the cover 6 placed on the cooking vessel 4 in proper alignment, as more fully described below.

In the preferred embodiment of FIG. 3A, the cooking vessel 4 has two side cutouts 17 and 17' terminating in outwardly angled spouts 26 and 26', one on each side of the cooking vessel 4 orthogonal to the cutout 15 associated with the cooking vessel elongated handle 16.

The preferred cooking vessel 4 also comprises a support handle 27. The support handle 27 is preferably located on the side wall 13 of the cooking vessel 4 opposite the elongated handle 16, extending outwardly from the side wall 13, as shown in FIGS. 1A, 1C, 2 and 3A, and 3B. The support handle 27 can be any shape, but is preferably generally "U-shaped," as shown, and can include an embossed or debossed logo.

As shown in FIGS. 1A-1C and in FIG. 2, the cover 6 is designed to fit over both the cooking vessel 4 and an auxiliary vessel 10, including when stored or during food preparation. The cover 6 can be made of any suitable material including stainless steel, carbon steel, copper, cast iron, cast aluminum, enameled aluminum, silicates such as glass, ceramics such as porcelain, and combinations, composites, and alloys thereof. Preferably, the cover 6 is made of the same material as the cooking vessel 4, and most preferably cast aluminum in the present embodiment.

Figure 4A:
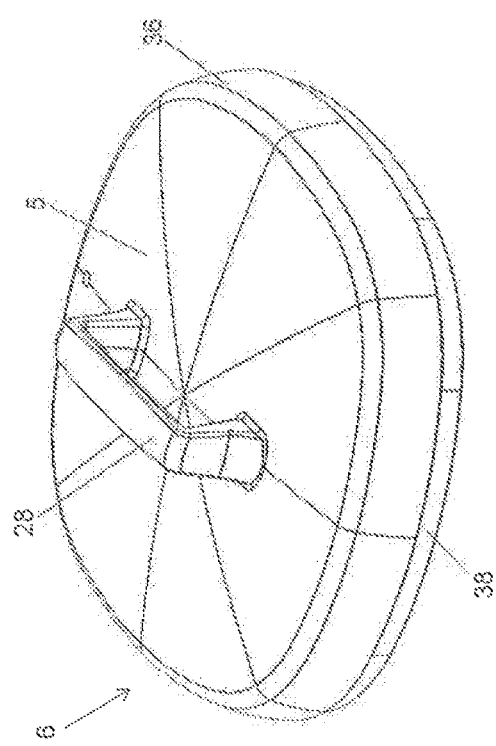
FIG. 4A is a perspective view of a cover of a cookware assembly according to the present invention.
Figure 4B:
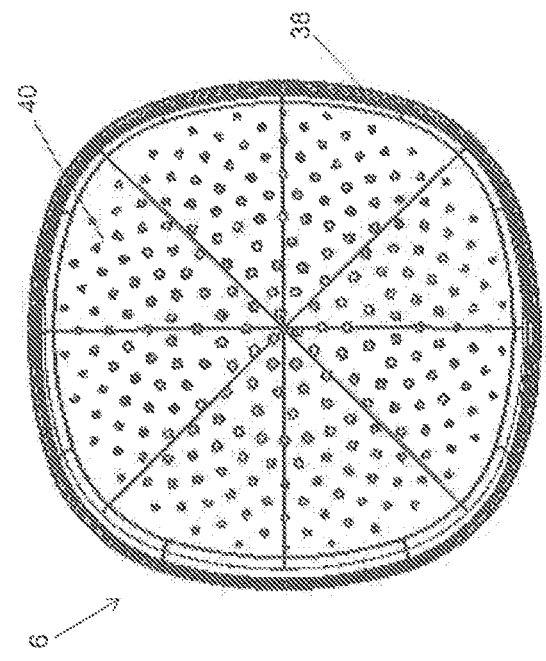
FIG. 4B is a bottom view of a cover of a cookware assembly according to the present invention.
Figure 4C:
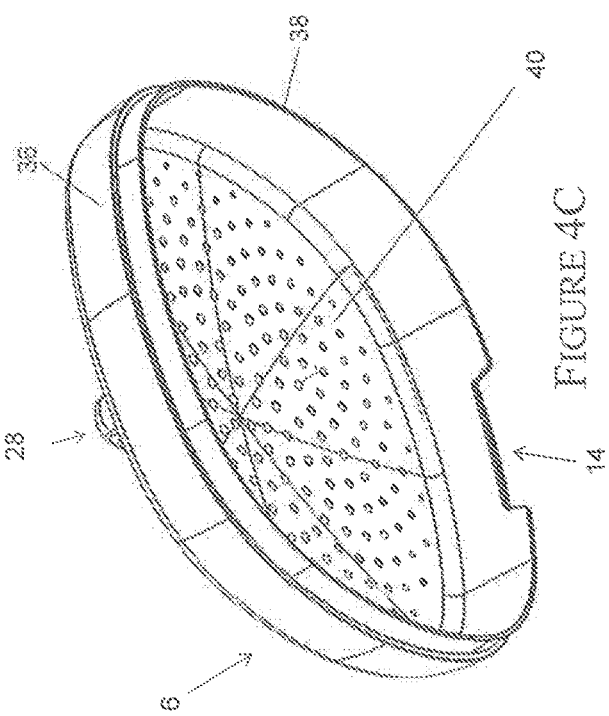
FIG. 4C is a bottom perspective view of a cover of a cookware assembly according to the present invention.

The cover 6 preferably comprises a top surface 5 and may comprise a continuous side wall 36 surrounding the top surface 5, as shown in FIGS. 4A-C. The side wall 36 can have any depth but preferably has a suitable depth to facilitate a variety of cooking methods including stir-frying, pressure-cooking, boiling, broiling, deep-frying, roasting, etc. In a preferred embodiment, the side wall 36 is of a sufficient depth to allow for roasting.

A lip 38 preferably forms a recessed edge along at least the majority of the inner perimeter or circumference of the side wall 36, as shown in FIG. 4C. Alternatively, a generally flat cover without a side wall 36 may have a lip 38 that extends downwardly from a bottom surface of the cover 6. In either case, the lip 38 preferably fits inside the cooking vessel 4, as shown in FIGS. 1A-C and in FIG. 2. The lip 38 of the cover 6 has a height that ensures a secure fit of the cover 6 on the cooking vessel 4, and the cooking vessel 4 may have a ledge on the interior of the side wall 13 to help position/support the cover 6 on the cooking vessel 4.

The underside of the interior of the cover 6 can comprise a drip surface 40 to aid in the condensation of fluids that then can drip back into the cooking vessel 4 during cooking. The drip surface 40 preferably comprises a plurality of raised bumps as shown in FIG. 4B, however, the formations can be any raised or depressed pattern on the top interior surface of the cover 6 which promotes condensation and dripping into the cooking vessel 4.

A handle 28 for the cover 6 may extend from a portion of the top surface 5 of the cover 6 to allow the cover 6 to be lifted off of the cooking vessel 4. Preferably, the handle 28 is located in the center of the top surface 5 of the cover 6, as shown in FIG. 3A. The handle 28 may be a single upward extending protuberance, such as a mushroom shaped or other decorative shaped protuberance, or a "U-shaped" handle for supporting heavier covers.

A gap 14 is preferably located on a portion of the lip 38 of the cover 6, as shown in FIG. 4C. The gap 14 allows the cover 6 to be placed on the cooking vessel 4 in different positions, each of which provides different functionality.

In a first position, the gap 14 on the cover 6 is aligned with the cutout 15 associated with the cooking vessel elongated handle 16 to create an opening through which the utensil 8 extends when the utensil 8 is engaged on the cooking vessel 4 and the cover 6 is placed on the cooking vessel 4.

In a second position, the gap 14 on the cover 6 is placed in line with a side cutout 17 on the cooking vessel 4, preferably orthogonal to the cutout 15. In this second position, the gap 14 on the cover 6 and the side cutout 17 on the cooking vessel 4 align to form an opening from which fluids can be poured during cooking with the cover 6 on. Of course, when the gap 14 on the cover 6 is aligned with a side cutout 17, and the cover 6 has only one gap 14, the lip 38 on the wall 36 of the cover 6 closes the cutout 15, so that the utensil 8 must be removed.

In a third position, the gap 14 on the cover 6 is placed on a portion of the cooking vessel 4 where there is no cutout 15 or side cutout 17, such as the portion of the cooking vessel 4 opposite the cutout 15 above handle 27, to seal the cookware assembly 2. In this position, the lip 38 on the wall 36 of the cover 6 closes the cutout 15 and any side cutout 17 orthogonal to the cutout 15. The third position creates a substantially sealed environment between the cover 6 and the cooking vessel 4 for cooking.

When a second side cutout 17' is placed on the side opposite the first side cutout 17, the cover 6 can be placed in a fourth position, which is similar to the second position but allows pouring through the second side cutout 17'.

Of course, the cover 6 and cooking vessel 4 may have any number of sides, with different combinations of gaps 14 and cutouts 15, 17, etc., that create different combinations of openings for the utensil 8, pouring, venting, etc. Additionally, the cover 6 may include indicia or physical elements to allow the user to properly position the cover 6 on the cooking vessel 4.

Figure 7:
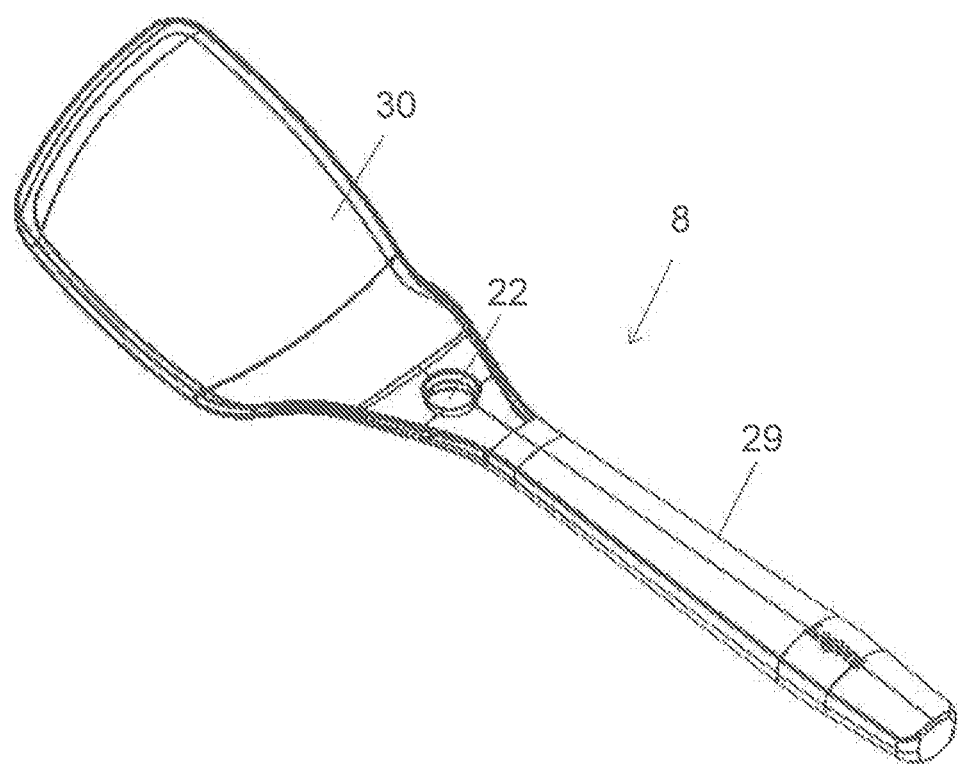
FIG. 7 is a perspective view of a utensil for a cookware assembly showing its component parts.

The utensil 8 generally comprises a handle 29 and an implement 30, as shown in FIG. 7. As described above, the handle 29 is preferably sized and shaped to nest in or rest on the elongated handle 16 of the cooking vessel 4. As shown in FIG. 7, a preferred handle 29 of the utensil handle 29 has a convex curvature that mates with the trough 20 of the elongated handle 16 having a corresponding concave curvature. Alternative preferred embodiments include a flat utensil handle 29 that rests on a flat top surface of the cooking vessel elongated handle 16.

The implement 30 can be any suitable implement depending on the cooking task being performed. For example, the implement 30 can be a turner, a ladle, a spatula, a whisk, etc., and can be made of any suitable material comprising wood, a high-temperature polymer, glass-filled nylon, thermoplastic elastomeric materials, silicone, stainless steel, carbon steel, copper, cast iron, cast aluminum, alloys, etc., and combinations thereof, suitable for the cooking environment.

The handle 29 can be fashioned of the same material as the implement 30, with the handle 29 and implement 30 being a continuous, integral structure, or can be made of another suitable material, including wood, stainless steel, silicone, high temperature polymer, glass-filled nylon, thermoplastic elastomeric materials, carbon steel, copper, cast iron, cast aluminum, enameled aluminum, alloys, etc., and combinations thereof. Alternatively, the handle 29 and implement 30 can be formed of different materials that are joined to form the utensil 8.

The preferred embodiment of the cookware assembly 2 may also comprise an auxiliary vessel 10. The auxiliary vessel 10 is preferably adapted to perform a cooking operation in conjunction with the cooking vessel 4. For instance, the auxiliary vessel 10 can facilitate the removal of liquids, the promotion of airflow, temperature control, etc., and can be in the form of steamer, a double boiler, a strainer, a colander, etc. The auxiliary vessel 10 is preferably the same shape as the cooking vessel 4, which may have any suitable shape.

Figure 5:
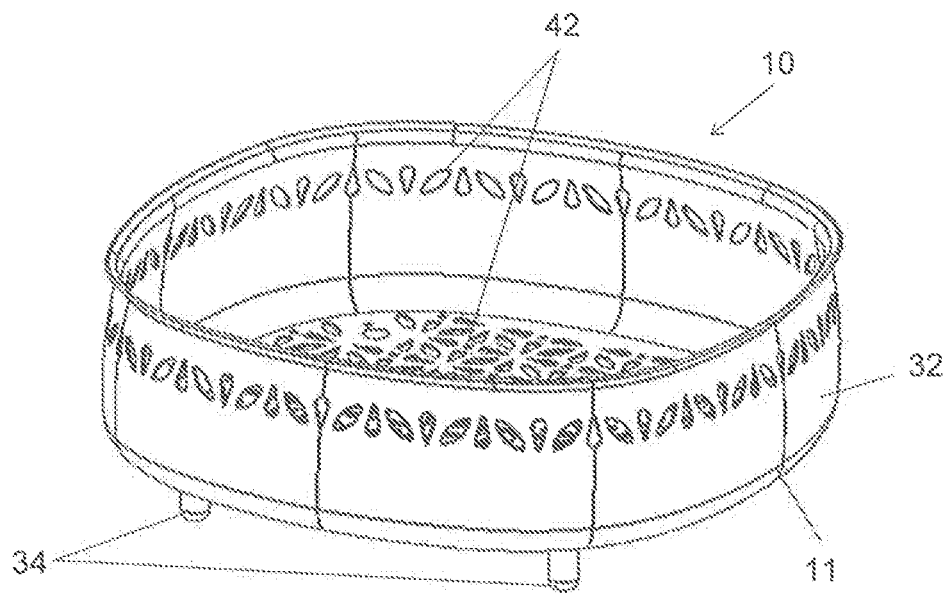
FIG. 5 is a perspective view of an auxiliary vessel for a cookware assembly according to the present invention.
Figure 6:
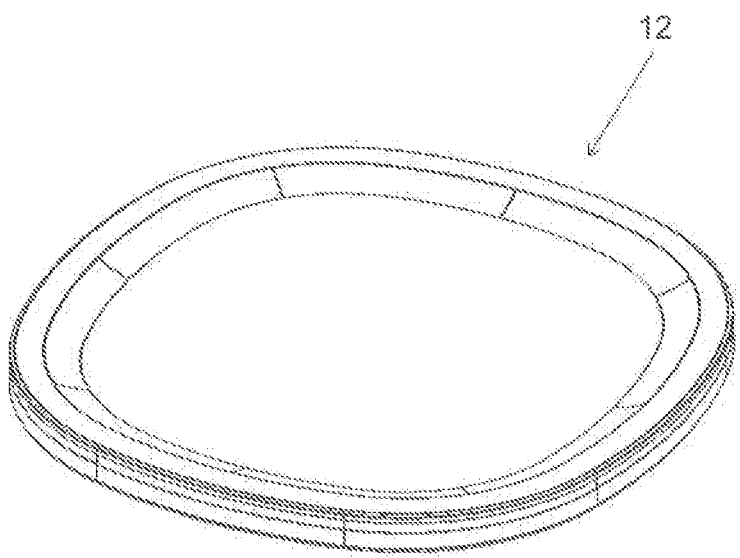
FIG. 6 is a perspective view of a trivet for a cookware assembly according to the present invention.

As shown in FIGS. 2 and 5, the auxiliary vessel 10 is preferably a steamer basket. The auxiliary vessel 10 preferably comprises a bottom surface 11 and a side wall 32 extending upwardly from the bottom surface 11. The preferred bottom surface 11 of the auxiliary vessel 10 is substantially flat, and the auxiliary vessel 10 can have any shape and size as long it fits within the cookware assembly 2, as shown in FIGS. 1A-C and FIG. 2. The auxiliary vessel 10 can be made of any suitable material, however, the auxiliary vessel 10 is preferably made of a suitable stainless steel material, aluminum or other suitable metal, or other high temperature polymer or silicone.

As will be understood, when the auxiliary vessel 10 is a steamer it comprises a plurality of openings 42, preferably on the bottom surface 11 and along one or more surfaces of the side wall 32. The openings 42 can be arranged in a decorative pattern, such the decorative pattern shown in FIGS. 2 and 5, however, the openings 42 should be capable of holding food that is being steamed while allowing fluids to circulate.

Additionally, a preferred auxiliary vessel 10 in the form of a steamer, double boiler or the like, comprises one or more legs 34 extending below the bottom surface 11 to hold the bottom surface 11 of the auxiliary vessel 10 above the interior bottom 9 of the cooking vessel 4 during cooking. In a preferred embodiment, the auxiliary vessel 10 contains three or more legs, with four legs being considered more suitable. Also, the preferred auxiliary vessel 10 allows the utensil 8 to be mounted on the cooking vessel 4 with the auxiliary vessel 10 therein and the cover 6 thereon, either due to a sufficiently short side wall 32 so that the utensil 8 sits over the side wall 32 or with the use of a gap (not shown) in the side wall 32 to accommodate the utensil 8.

In some embodiments, the cookware assembly 2 also includes a trivet 12. The trivet 12 has a top and bottom, where the top is preferably concave and generally conforms to the bottom exterior of the cooking vessel 4. As shown in FIGS. 1A-1C and FIG. 2, the cooking vessel 4 rests on the top of the trivet 10 while the bottom of the trivet 10 rests on a countertop, table or the like. In some embodiments, the bottom surface of the trivet 10 is substantially flat and made of a material, such as wood, polymer, glass, ceramic or the like, that can also act as a cutting board.

While certain exemplary embodiments have been described and shown in the accompanying drawings, it is to be understood that such embodiments are merely illustrative and do not limit the current invention. Accordingly, this invention is not restricted to the specific constructions and arrangements shown and described since variation, modification, and/or alternatives can occur to those ordinarily skilled in the art. All such variations, modifications and/or alternatives are intended to fall within the scope of the present invention.

The term "comprising" as used in the following claims is an open-ended transitional term that is intended to include additional elements not specifically recited in the claims. It is also noted that any feature or element positively identified in this document may also be specifically excluded as a feature or element of an embodiment of the present invention.

The invention claimed is:

1. A cookware assembly comprising:
   a cooking vessel;
   a cover configured to be positioned on the cooking vessel, wherein the cover comprises at least one gap;
   a utensil capable of resting on the cooking vessel; and
   a steamer configured to be positioned in the cooking vessel, wherein the steamer comprises a bottom surface and a continuous sidewall, the continuous sidewall extending upwardly from the bottom surface;
   wherein the utensil includes an engagement member engaging with the cooking vessel when the utensil is resting on the cooking vessel;
   wherein the steamer is provided with a plurality of openings on one of the bottom surface and the side wall;
   wherein the utensil is configured to be positioned over the side wall of the steamer when the utensil is resting on the cooking vessel and when the steamer is positioned in the cooking vessel.

2. The cookware assembly of claim 1, wherein the cooking vessel comprises an interior, an exterior, a vessel side wall and an elongated handle extending outwardly from the exterior, and wherein the vessel side wall is configured to surround the steamer when the steamer is positioned in the cooking vessel.

3. The cookware assembly of claim 1, wherein the cover further comprises a bottom surface and a lip extending downwardly from the bottom surface, wherein the at least one gap in the cover is formed in the lip.

4. A cookware assembly comprising:
   a cooking vessel;
   a cover configured to be positioned on the cooking vessel, wherein the cover comprises a bottom surface, a lip extending downwardly from the bottom surface, at least one gap formed in the lip, and at least one indicator that indicates the location of at least one gap in the cover;
   a utensil; and
   a steamer configured to be received in the cooking vessel, wherein the steamer comprises a bottom surface and a continuous sidewall, the continuous sidewall extending upwardly from the bottom surface, and wherein the steamer is provided with a plurality of openings on at least one of the bottom surface and the side wall;
   wherein the utensil includes an engagement member engaging with the cooking vessel when the utensil is resting on the cooking vessel.

* * * * *